(12) United States Patent
Davies et al.

(10) Patent No.: US 7,486,952 B1
(45) Date of Patent: Feb. 3, 2009

(54) FACILITATED SECURITY FOR HANDOFF IN WIRELESS COMMUNICATIONS

(75) Inventors: Stephen William Davies, Toronto (CA); Michaela C Vanderveen, Lincroft, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 09/501,168

(22) Filed: Feb. 9, 2000

(51) Int. Cl.
*H04Q 7/20* (2006.01)
*H04Q 7/00* (2006.01)
*H04L 1/00* (2006.01)

(52) U.S. Cl. .............. 455/436; 455/435.1; 455/450; 455/437; 370/331; 370/337

(58) Field of Classification Search ............ 455/411, 455/435, 414.1, 436–445, 410, 561.1, 435.1, 455/450, 337; 370/329–334
See application file for complete search history.

(56) References Cited

U.S. PATENT DOCUMENTS

| | | | | |
|---|---|---|---|---|
| 5,195,090 | A * | 3/1993 | Bolliger et al. ............. | 370/314 |
| 5,241,598 | A * | 8/1993 | Raith ......................... | 380/248 |
| 5,590,172 | A * | 12/1996 | Lodwig et al. .............. | 455/436 |
| 5,598,459 | A * | 1/1997 | Haartsen ..................... | 455/411 |
| 5,920,818 | A * | 7/1999 | Frodigh et al. .............. | 455/443 |
| 6,125,276 | A * | 9/2000 | Lupien ........................ | 455/436 |
| 6,161,013 | A * | 12/2000 | Anderson et al. ........... | 455/437 |
| 6,233,456 | B1 * | 5/2001 | Schiff et al. ................. | 455/439 |
| 6,370,380 | B1 * | 4/2002 | Norefors et al. ............. | 455/436 |
| 6,418,130 | B1 * | 7/2002 | Cheng et al. ................ | 370/331 |
| 6,434,134 | B1 * | 8/2002 | La Porta et al. ............. | 370/338 |
| 6,587,680 | B1 * | 7/2003 | Ala-Laurila et al. ......... | 455/411 |
| 6,728,540 | B1 * | 4/2004 | DeSantis et al. ............. | 455/437 |
| 7,047,009 | B2 * | 5/2006 | Laroia et al. ................ | 455/437 |
| 7,376,425 | B2 * | 5/2008 | Laroia et al. ................ | 455/437 |
| 2005/0070283 | A1 * | 3/2005 | Hashimoto et al. ....... | 455/435.1 |
| 2005/0124344 | A1 * | 6/2005 | Laroia et al. ................ | 455/436 |
| 2006/0073836 | A1 * | 4/2006 | Laroia et al. ................ | 455/450 |
| 2006/0126577 | A1 * | 6/2006 | Yano et al. .................. | 370/337 |
| 2008/0101295 | A1 * | 5/2008 | Tomita et al. ............... | 370/331 |
| 2008/0188221 | A1 * | 8/2008 | Hashimoto et al. ....... | 455/435.1 |

FOREIGN PATENT DOCUMENTS

| | | |
|---|---|---|
| EP | 1124400 A2 | 1/2001 |
| JP | 11-187452 * | 7/1999 |
| WO | WO 00/41427 | 7/2000 |
| WO | WO 00/49827 | 8/2000 |

OTHER PUBLICATIONS

Cheng, Y. et al.: "Token Based Aughentication for Handover Security" Secure Information Networks. Communications and Multimedia Security, XX, XX, 1999, pp. 231-243, XP001000497 paragraph '02.1!-paragraph '03.2!.

Web site, http://www.tik.ee.ethz.ch/~wand "The Magic Wand" 34 pages, 1998.

* cited by examiner

*Primary Examiner*—William D Cumming
(74) *Attorney, Agent, or Firm*—Eugene J. Rosenthal

(57) ABSTRACT

A first base station which initially receives a service request from a wireless terminal requests authentication information from a central security node and receives in response at least, one, but typically two or more, sets of security information. When it is time for a handoff from the first base station to a second base station, the first base station transmits to the second base station at least one of the sets of security information it received from the central security node. The second base station then uses the information it received from the first base station to authenticate the wireless terminal.

19 Claims, 2 Drawing Sheets

FACILITATED SECURITY FOR HANDOFF IN WIRELESS COMMUNICATIONS

TECHNICAL FIELD

This invention relates to the art of wireless communication, and more particularly, to a system of insuring that only authorized users of the network providing wireless communications services are granted access to the network.

BACKGROUND OF THE INVENTION

Prior art wireless systems only permit authorized wireless terminals to have access to the wireless network. In order to permit a wireless terminal access to the network the wireless terminal must be authenticated. The term "authentication" is used herein in the conventional manner, e.g., the process of verifying that an entity is really that who it alleges it is. Authentication may be needed multiple times during the duration of a call, e.g., originally when the call is initiated and thereafter each time the wireless terminal makes a transition across any defined boundary in the network.

Authentication is achieved by comparing information derived from secret information stored in the wireless terminal with the same derived information existing somewhere else in the network. Typically the derived information must be transmitted each time a new authentication is required for a particular wireless terminal during the course of a single call from the storage location of the derived information that is "closest" to the location of the comparison, where "closest" is in terms of network hierarchy.

A wireless terminal communicates with a base station via an airlink. If the base station is not the location of the comparison, the base station must forward information from the wireless terminal to the location of the comparison for use in the comparison. The location in the network in which the derived information is stored is typically in a so-called "visitor location register" (VLR). The derived information is generated in the network at a so-called "home location register" (HLR) or other authentication center as may be present, depending on the particular network design. When a wireless terminal crosses a network boundary that separates the area served by a first VLR to the area served by a second VLR, the first VLR may forward the derived information to the second VLR for its use. Alternatively the second VLR may obtain its own derived information from the HLR. Note that the HLR may act as a VLR when the wireless terminal first powers up in an area directly served by the HLR.

Disadvantageously, the cost of the prior art network is high, because of the various specialized entities therein and the complex control procedures required.

SUMMARY OF THE INVENTION

We have realized that network architecture may be simplified, and the costs relating to network installation reduced, by pushing the defined boundaries in the network down to the base station level. However, a result of doing so is that authentication is required each time a wireless terminal switches communication from one base station to another. In other words, after pushing the defined boundaries down to the base station level, each time there is a handoff of the wireless terminal from one base station to another a network boundary is crossed and authentication is required. To achieve such authentication in an efficient manner, in accordance with the principles of the invention, security information, i.e., the derived information, is transferred from one base station directly to another. Note that by directly it is meant without accessing any other source of the derived information, although the information may be transferred via other intervening nodes of the network that form an interconnection path for the base stations. Advantageously, a simplified network, i.e., a network with reduced hierarchy from a control point of view, e.g., one that only requires HLR and base station network entities along with interconnection therefore, may be employed with a minimal decrease in performance, e.g., a minimal increase in delay, during the handoff process.

More specifically, in one embodiment of the invention, a first base station which initially receives a service request from a wireless terminal requests authentication information from a central security node, e.g., an HLR, and receives in response at least, one, but typically two or more, sets of security information. The sets of security information may be a password, a challenge-response pair, a challenge-response cipher key tuple, or the like. When it is time for a handoff from the first base station to a second base station, the first base station transmits to the second base station at least one of the sets of security information it received from the central security node. The second base station then uses the information it received from the first base station to authentication the wireless terminal, and/or engage in encrypted communication.

DETAILED DESCRIPTION

Figure 1:
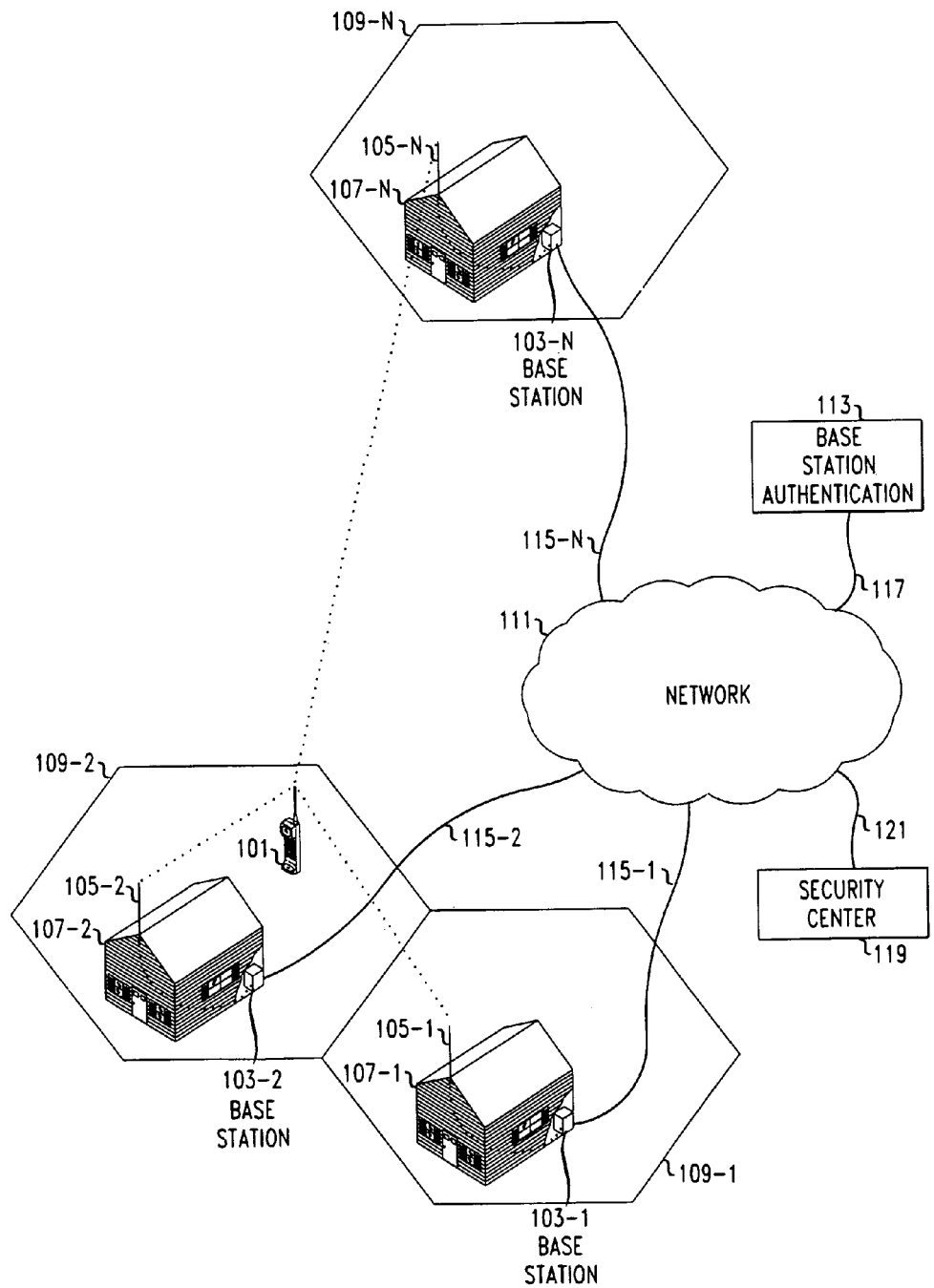
FIG. 1 shows an exemplary network arrangement in accordance with the principles of the invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

FIG. 1 shows an exemplary network arrangement in accordance with the principles of the invention. Shown in FIG. 1 are a) wireless terminal 101; b) N base stations 103, where N is an integer greater than or equal to 2, including base station 103-1 through 103-N; c) N antennas 105, including antennas 105-1 through 105-N; d) N structures 107, including structures 107-1 through 107-N; e) N cells 109, including cells 109-1 through 109-N; f) network 111; g) base station authentication unit 113; h) N communication links 115, including communication links 115-1 through 115-N; i) communication links 117 and 121; j) security center 119.

Wireless terminal 101 is able to communicate with multiple base stations which transmit with sufficient signal strength to be detected and useable for communication at the current location of wireless terminal 101. Once a signal of sufficient strength is detected for a particular base station, wireless terminal 101 may engage in communication with that base station. The particular types of wireless link and protocol, i.e., the air interface, employed by wireless terminal 101 are not essential to the invention and may be any type desired by the implementor, although of course the radio link and protocol employed by wireless terminal 101 must be the same type employed by base stations 103.

Wireless terminal 101 may achieve communication with multiple base stations in any manner desired by the implementer. For example, wireless terminal 101 may have only a single receiver, and it may receive signals, when not occupied with the exchange of information with the base station currently serving it, from other base stations that have signals of sufficient strength reaching wireless terminal 101. Alternatively, wireless terminal 101 may receive signals from multiple base stations simultaneously, e.g., by employing multiple parallel receivers in wireless terminal 101. Further alternatively, wireless terminal 101 may have more than one receiver, but the number of receivers is less than the number of base stations from which wireless terminal 101 can receive a signal of sufficient strength at its current location, so wireless terminal 101 needs to perform scanning on at least one of its receivers to obtain signals for some of the base stations.

Base stations 103 are substantially conventional base stations except for the following. First, base stations 103 need not be connected to a dedicated network for inter-base-station communication. Instead, base stations 103 can employ a shared public network, e.g., an internet protocol (IP)-based network such as the Internet. Second, each base station 103 need not contain any "map" information. Instead, each of base stations 103 is capable of discovering its necessary portions of the "map" information. Preferably, base stations 103 are small base stations that can easily be incorporated into a small space, e.g., one that is already available, rather than requiring dedicated construction and site preparation. Advantageously, such small size, coupled with the ability to discover the necessary portions of the "map" information, enable the rapid construction of a new wireless communication network. Furthermore, such a wireless communication network is flexible in its architecture, i.e., base stations can easily be added or removed, and it is also easy to maintain.

Each of antennas 105 are coupled to a respective one of base stations 103. Each of antennas 105 radiates the signal developed by its respective one of base stations 103. Each combination of a one of base stations 103 and its respective one of antennas 105 yields a one of cells 109, which is a particular coverage area. The shape of cells 109 in FIG. 1 do not represent actual cell shapes but instead are merely conventional notation for cells. Note that the shape of the actual various cells 109 are all independent.

Each of structures 107 provides a facility in which to place one or more of base stations 103. Furthermore, structures 107 may also provide a place on which to mount antennas 105. For example, some of structures 107 may be already existing homes in which a one of base stations 103 is located in an unused space and to which a one of antennas 105 is exteriorly affixed.

Network 111 provides a way for base stations 103 to communicate with each other, as well as with base station authentication unit 113 and security center 119. Network 111 may be made up of various subnetworks, which may be networks in their own right. Furthermore, the various subnetworks may be of different types and may employ different protocols. In one embodiment of the invention, network 111 is a packet based network, e.g., an asynchronous transfer mode (ATM) network or an IP network.

Each of base stations 103 is connected to network 111 via a respective one of communication links 115, which may be construed as part of network 111. For example, where network 111, or at least a subnetwork thereof, is an IP network, and one of base stations 103 are located within structures 107 that are homes, communications link 115 may be an Internet connection, e.g., over cable television lines or a fiber-to-the curb connection, that is shared by the base station for communicating with other base stations and by the occupants of the home for Internet browsing.

Base station authentication unit 113 contains a list of all valid base stations 103, and any associated information such as security keys and alternative identifiers or addresses of the base station. A base station may be listed in base station authentication unit 113 at any point. However, the base station only becomes valid once it is listed in base station authentication unit 113. Although shown herein as a single unit, in practice base station authentication unit 113 may be made up of several parts, which need not be geographically collocated.

Furthermore, to improve reliability and performance, some or all of the various parts or functions of base station authentication unit 113 may be replicated, as will be readily recognized by those of ordinary skill in the art.

Base station authentication unit 113 is connected to network 111 via communication link 117. Of course, when base station authentication unit 113 is made up of more than one part, or is replicated, communication link 117 is construed as covering all the necessary communications paths between network 111 and the various parts or replicas.

Security center 119 contains a list of all valid wireless terminals that may be served. In addition, security center 119 contains security information, such as authentication challenge-response pairs and/or encryption keys associated with each wireless terminal. The security information may be distributed by security center 119 to base stations 103, as necessary. A wireless terminal may be listed in security center 119 at any point. However, the wireless terminal only becomes valid once it is listed in security center 119. Although shown herein as a single unit, in practice security center 119 may be made up of several parts, which need not be geographically collocated. Furthermore, to improve reliability and performance, some or all of the various parts or functions of security center 119 may be replicated, as will be readily recognized by those of ordinary skill in the art.

Security center 119 is connected to network 111 via communication link 121. Of course, when security center 119 is made up of more than one part, or is replicated, communication link 121 is construed as covering all the necessary communications paths between network 111 and the various parts or replicas.

Figure 2:
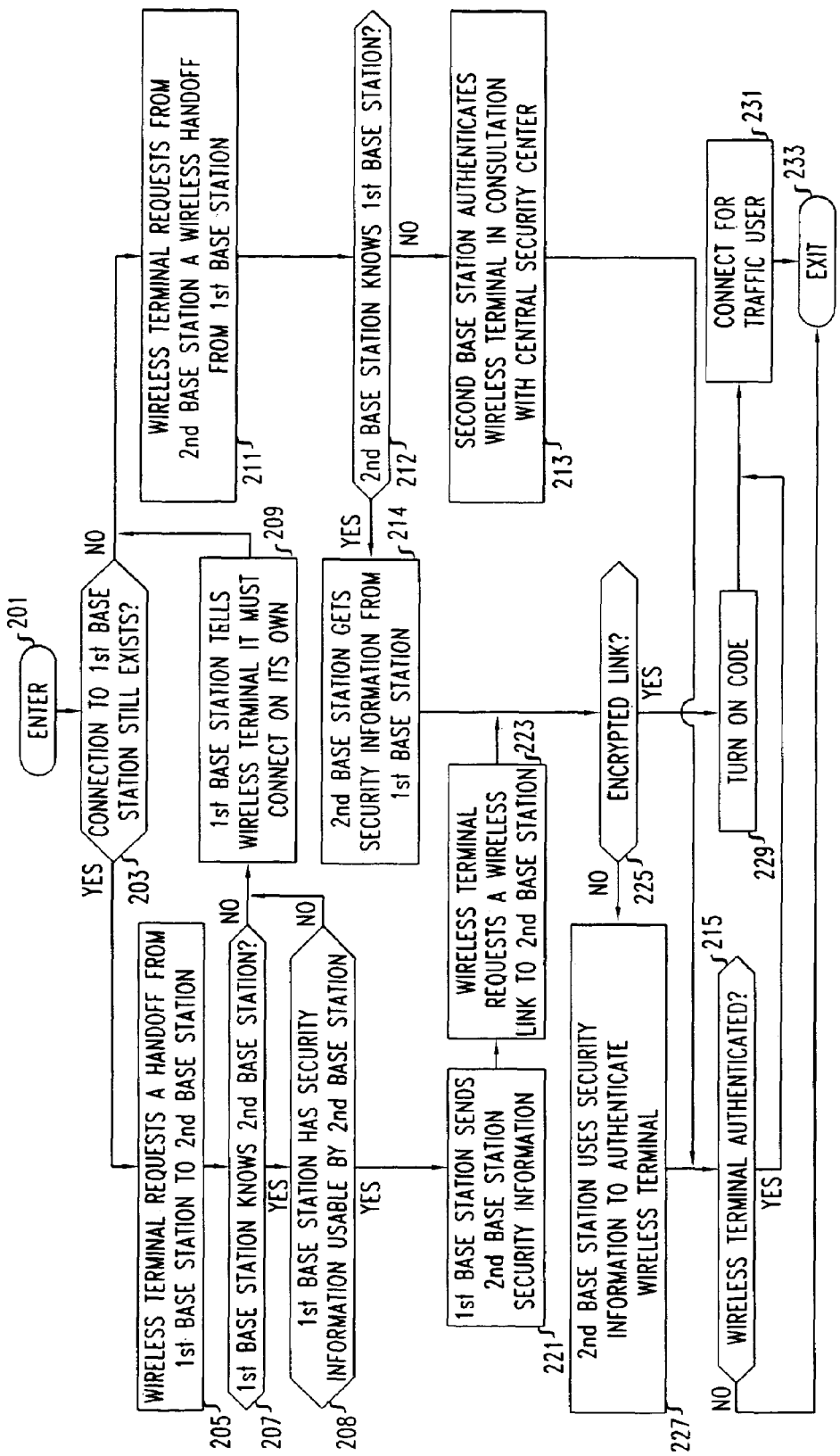
FIG. 2 shows an exemplary process, in flow chart form, for performing a handoff between the base stations of FIG. 1 in accordance with the principles of the invention.

FIG. 2 shows an exemplary process, in flow chart form, for performing a handoff between the base stations of FIG. 1 in accordance with the principles of the invention. More specifically, as part of the handoff process, a base station may discover and update at least portions of the "map" of the base stations, i.e., the pattern of neighboring base stations and related information, if any. See, for example, our concurrently filed U.S. patent application Ser. No. 09/500,675 which is incorporated by reference as if fully set forth herein. The portion of the map that is discovered by a particular base station is typically its neighbors to which it can possibly handoff a call it is serving. It takes at least one handoff with each such base station neighbor for the particular base station to discover its entire local map.

The process is entered in step 201 when it is determined that a wireless terminal, e.g., wireless terminal 101 (FIG. 1), requires a handoff, because the signal of the radio link of the base station with which it is communicating, e.g., base station 103-1 (FIG. 1) has become sufficiently weaker than that of another particular base station, e.g., base station 103-2, so that it appears that the other particular base station could provide a better radio link. Next conditional branch point 203 (FIG. 2) tests to determine if the connection to the first base station, e.g., base station 103-1 of FIG. 1, still exists, since it is possible that the received signal from the first base station became so weak at the wireless terminal, or the signal received at the first base station from the wireless terminal became so weak, that the connection between the first base station and the wireless terminal has become severed prior to a handoff being achieved. If the test result in step 203 is YES, indicating that that the connection continues to exist between the first base station and the wireless terminal, control passes to step 205, in which the wireless terminal requests a handoff from the first base station to the second base station, e.g., base station 103-2 of FIG. 1. Alternatively, the wireless terminal may send various measurements of the signal strengths as received at the wireless terminal for the first and second base stations to the first base station, which determines that it is an appropriate time for a handoff. The first base station therefore tells the wireless terminal to connect to the second base station.

Next, conditional branch point 207 tests to determine if the first base station "knows" the second base station, i.e., the first base station has the second base station listed in its "map" information, such a listing having been the result of a previous handoff of a wireless terminal between the first and second base stations. More specifically, as part of the listing in the map information, the first base station may know a) the base station identification of the second base station, b) the network address of the second base station, e.g., its IP address, and c) security information, such as the public key of the second base station, which is used to secure communication between the first and second base stations, in accordance with an aspect of the invention. If the test result in step 207 is NO, indicating the first base station does not "know" the second base, control passes to step 209, in which the first base station tells the wireless terminal that it does not know the second base station and that the wireless terminal must arrange for a wireless link connection with the second base station on its own. This may be achieved, for example, by using the same process that a wireless terminal uses to establish an initial wireless link with a base station when it first powers up within the cell served by that base station, as described further hereinbelow.

If the test result in step 203 is NO, indicating that the connection from the wireless terminal to the first base station had been terminated, or after step 209, control passes to step 211, in which the wireless terminal requests that the second base station establish with it a wireless link. In response to this request, in conditional branch point 212, the second base station tests to determines if it knows the first base station. If the test result in step 212 is NO, indicating that the second base station does not know the first base station, control passes to step 213, in which the second base station attempts to authenticate the wireless terminal, which typically requires consultation of information stored in a security center, e.g., security center 119 of FIG. 1. Thereafter, control passes to step 215 and the process continues as described hereinbelow. If the test result in step 212 is YES, control passes to step 214, in which security information for the wireless terminal is requested of the first base station, and received therefrom, by the second base station, in accordance with the principles of the invention. Advantageously, the second base station, which already trusts the first base station, need not engage in authenticating the wireless terminal with the security center, thus saving considerable time and facilitating the handoff process. Although not shown in FIG. 2, because it is expected to be a somewhat unusual situation, in the event there is no security information available at the first base station, e.g., all of the security information available to the first base station has already been used up, control should be passed to step 213.

If the test result in step 207 is YES, indicating that the first base station knows the second base station, control passes to conditional branch point 208 in which the first base station tests to determine if it has security information available regarding the wireless terminal that can be used by the second base station, in accordance with the principles of the invention. Such security information may be challenge-response authentication pairs and/or encryption keys associated with the wireless terminal, or the like. If the test result in step 208 is NO, indicating that the first base station does not have any security information available regarding the wireless terminal that can be used by the second base station, control passes to step 209, and the process continues as described above. If the test result in step 208 is YES, indicating that the first base station has security information available regarding the wireless terminal that can be used by the second base station, control passes to step 221, in which the first base station sends, e.g., on its own accord, the available security information to the second base station, in accordance with the principles of the invention. The sending of such security information may be construed at the second base station as a request for a handoff of the wireless terminal from the first base station to the second base station. Advantageously, the second base station, which already trusts the first base station, need not engage in authenticating the wireless terminal with the security center, thus saving considerable time and facilitating the handoff process.

Next, in step 223, the wireless terminal requests that the second base station establish with it a wireless link. Thereafter, or after the execution of step 214, control passes to conditional branch point 225, which tests to determine if the wireless terminal was using encryption to communicate its data with the first base station. If the test result in step 225 is NO, indicating a nonencrypted link was used by the wireless terminal to communicate its data with the first base station, control passes to step 227, in which the second base station uses the security information it obtained from the first base station to authenticate the wireless terminal.

Thereafter, conditional branch point 215 tests to determine if the wireless terminal was successfully authenticated. If the test result in step 215 is YES, indicating that the wireless terminal is allowed to utilize the base stations for communication, control passes to step 231, in which the wireless terminal is connected for carrying user traffic to the second base station. Thereafter, the process is exited in step 233. If the test result in step 215 is NO, indicating that the wireless terminal is not allowed to utilize the base stations for communication, control passes to step 233 and the process is exited.

If the test result in step 225 is YES, indicating that encrypted link was used by the wireless terminal to communicate its data with the base station, control passes to step 229, in which the enciphering and deciphering of data process is initiated between the wireless terminal and the second base station. To this end, the ciphering algorithm is initialized. Once user data begins to flow, it will be appropriately encrypted or decrypted automatically. Note that use of an encrypted link with a new ciphering key passed from the first base station to the second base station, after the wireless terminal is authenticated upon activation in the cell of a base station that did not participate in an expedited handoff to receive the wireless terminal, achieves the same goal as a direct reauthentication of the wireless terminal.

Control then passes to step 231, in which the wireless terminal is connected for carrying user traffic to the second base station. Also, as part of this step, other portions of the network which were transmitting data to the wireless terminal via the first base station are instructed to now transmit their data to the wireless terminal via the second base station, e.g., using the techniques of the well known Mobile Internet Protocol. Thereafter, the process is exited in step 233.

Note that a YES result in step 207 implies that the second base station likewise knows the first base station, which would only not be true in unusual cases of error. Such error, which would be indicated by a refusal of the second base station to participate in an expedited handoff, requires processing, e.g., having control pass to step 209 to perform a nonexpedited handoff.

Note also that the first base station may not send the second base station all the security information it initially received. One reason for this may be that the first base station used some of that information in communicating with the wireless terminal, and to help foil any security attacks it is good policy to use certain types of security information, such as challenge-response pairs or encryption keys, only once. Further, note that security information obtained by the first base station may have been obtained from the security center or another base station.

What is claimed is:

1. A method for facilitating secure handoff in a network having at least first and second wireless base stations and at least one wireless mobile terminal, the method comprising the steps of:
   receiving a request from said at least one wireless mobile terminal for a handoff from said first base station to said second base station; and
   transferring security information that was originally supplied by a central security node and was not used by said first base station from said first base station to said second base station in response to said request;
   wherein at least a portion of said security information is used to validate said at least one mobile wireless terminal to said second base station.

2. The invention as defined in claim 1 further wherein said security information includes a set including at least a random number, an authentication derivable by said wireless mobile terminal but not said first or second base stations, and a key.

3. The invention as defined in claim 1 further wherein said security information transferred from said first base station to said second base station in response to said request is less than all of the security information received by said first base station.

4. The invention as defined in claim 3 wherein all of the security information received by said first base station was received from a wireless mobile terminal validation system.

5. The invention as defined in claim 3 wherein all of the security information received by said first base station was received from a third base station.

6. The invention as defined in claim 1 wherein said transferring security information from said first base station to said second base station in response to said request is performed only when said first base station knows said second base station prior to said receiving step.

7. The invention as defined in claim 1 further comprising the step of initiating an encrypted link between said second base station and said wireless terminal when said first base station and said wireless terminal were communicating using an encrypted link, said second base station using said security information transferred from said first base station to said second base station in initiating said encrypted link between said second base station and said wireless terminal.

8. A method for performing handoffs in a network for providing wireless communication service having at least first and second wireless base stations and a least one wireless terminal, the method comprising the steps of:
   transmitting a request, from said wireless terminal for a handoff between said first base station and said second base station;
   receiving a response to said request at said wireless terminal, when said second base station knows said first base station prior to receiving said request, said response indicating that said second base station can engage in expedited handoffs with said first base station; and
   connecting said wireless terminal for user traffic to said second base station;

wherein said expedited handoff employs information about said wireless terminal transferred from said first base station to said second base station.

9. The invention as defined in claim 8 wherein said information is security information.

10. The invention as defined in claim 8 wherein said information is security information received from a security center.

11. The invention as defined in claim 8 wherein said information is security information received from a base station other than said first or second base stations.

12. The invention as defined in claim 8 wherein said information is security information and includes at least one from the set consisting of: (i) a password, (ii) a challenge-response pair, and (iii) a challenge-response cipher key tuple.

13. The invention as defined in claim 8 wherein said information is security information that is received over a network for inter base station communication.

14. The invention as defined in claim 8 wherein said connecting step further includes the step of
initiating an encrypted link between said second base station and said wireless terminal when said first base station and said wireless terminal were communicating using an encrypted link prior to said handoff request, said second base station using security information transferred from said first base station to said second base station as part of said response in initiating said encrypted link between said second base station and said wireless terminal.

15. A method for performing handoffs in a network having at least first and second wireless base stations and a least one wireless terminal, the method comprising the steps of:
transmitting a request, from said wireless terminal for a handoff between said first base station to said second base station;
when said second base station does not know said first base station prior to receiving said request, receiving at said wireless terminal an indication that it must connect to said second base station without benefit of security information supplied from said first base station.

16. The invention as defined in claim 15 wherein said security information is received from a security center.

17. The invention as defined in claim 15 wherein said security information is received from a base station other than said first or second base stations.

18. A method for performing a handoff in a wireless network having at least first and second base stations and a least one wireless terminal, the method comprising the steps of:
receiving a request, by said second base station, from said wireless terminal for a handoff between said first base station to said second base station;
performing an expedited handoff using previously unused security information when second base station knows said first base station prior to receiving said request; and
performing a nonexpedited handoff when second base station does not know said first base station prior to receiving said request.

19. The invention as defined in claim 18 wherein said step of performing an expedited handoff includes the step of transferring security information from said first base station to said second base station.

* * * * *